Nov. 8, 1966  E. N. NECKEL ET AL  3,283,968

SHIRT FOLDING MECHANISM

Filed March 8, 1965  7 Sheets-Sheet 1

INVENTORS
EDMUND N. NECKEL
VICTOR SHUR
BY
*George H. Fritzinger*
AGENT

INVENTORS
EDMUND N. NECKEL
VICTOR SHUR
BY George H. Fritzinger
AGENT

Nov. 8, 1966  E. N. NECKEL ET AL  3,283,968
SHIRT FOLDING MECHANISM

Filed March 8, 1965  7 Sheets-Sheet 5

INVENTORS
EDMUND N. NECKEL
VICTOR SHUR
BY
George H. Fritzinger
AGENT

Nov. 8, 1966　　　　E. N. NECKEL ET AL　　　3,283,968
SHIRT FOLDING MECHANISM

Filed March 8, 1965　　　　　　　　　　　　7 Sheets-Sheet 6

INVENTORS
EDMUND N. NECKEL
VICTOR SHUR
BY
George H. Fritzinger
AGENT

FIG. 21

United States Patent Office 3,283,968
Patented Nov. 8, 1966

3,283,968
SHIRT FOLDING MECHANISM
Edmund N. Neckel, Rochester, and Victor Shur, East Rochester, N.Y., assignors to McGraw-Edison Company, Elgin, Ill., a corporation of Delaware
Filed Mar. 8, 1965, Ser. No. 438,010
13 Claims. (Cl. 223—37)

This invention relates to an improved shirt folding mechanism adapted especially for folding short-sleeve shirts. It is an object to provide a shirt folding mechanism which is markedly simpler in construction and arrangement than has been heretofore provided.

It is another object to provide a shirt folding mechanism comprising a plurality of folding arms which are interconnected into a unitary mechanism simply by link members and which are all operated by a single motive means.

Another object is to provide a folding mechanism for short-sleeve shirts which operates in an improved and simplified manner using only three folding arms.

Another object is to provide an improved shirt folding mechanism which is operated by a single air-cylinder controlled by an improved pneumatic system.

A still further object is to provide such improved shirt folding mechanism which is of a compact durable construction and which is economical to produce and easy to operate.

These and other objects and features of the invention will be apparent from the following description and the appended claims.

In the description of the invention, reference is had to the accompany drawings, of which.

Figure 1:
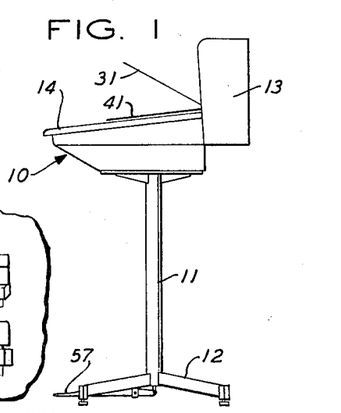
FIGURE 1 is a right hand elevational view of the present shirt folding mechanism.
Figure 9:
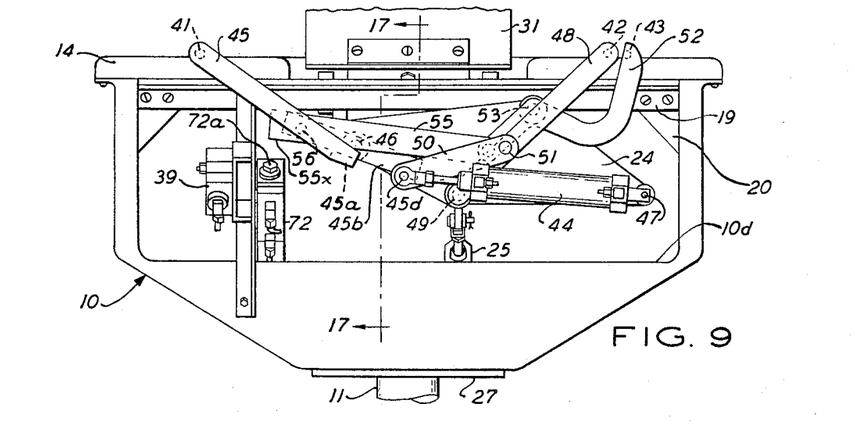
FIGURES 9, 11, 13 and 15 are rear views parallel with the table top and with the supply bin removed showing the folding mechanism in progressive stages of operation from an unoperated or "open" position in FIGURE 9 to a fully operated position in FIGURE 15.

The present shirt folding mechanism has the appearance of a reading stand as shown in FIGURE 1. It comprises an upper table structure 10 mounted on a post 11 itself supported by three legs 12. At the rear of the table structure there is a bin 13 for holding cardboards, bags, fastening bands, etc., which are used in connection with the present folding mechanism. A table top 14 supports the shirts to be folded as indicated in FIGURES 1 and 9. The table top is bolted to an upper rim flange 10b of a shell or tub-like housing 10a. Both the table top and housing 10a are preferably made of reinforced fiber glass. The housing 10a has an inclined bottom wall merging at the center into a flat central section provided with a large opening 10c. The flat section is bolted at 27a to a metal mounting plate 27 secured to the upper end of the post 11.

Figures 17, 19, 20:
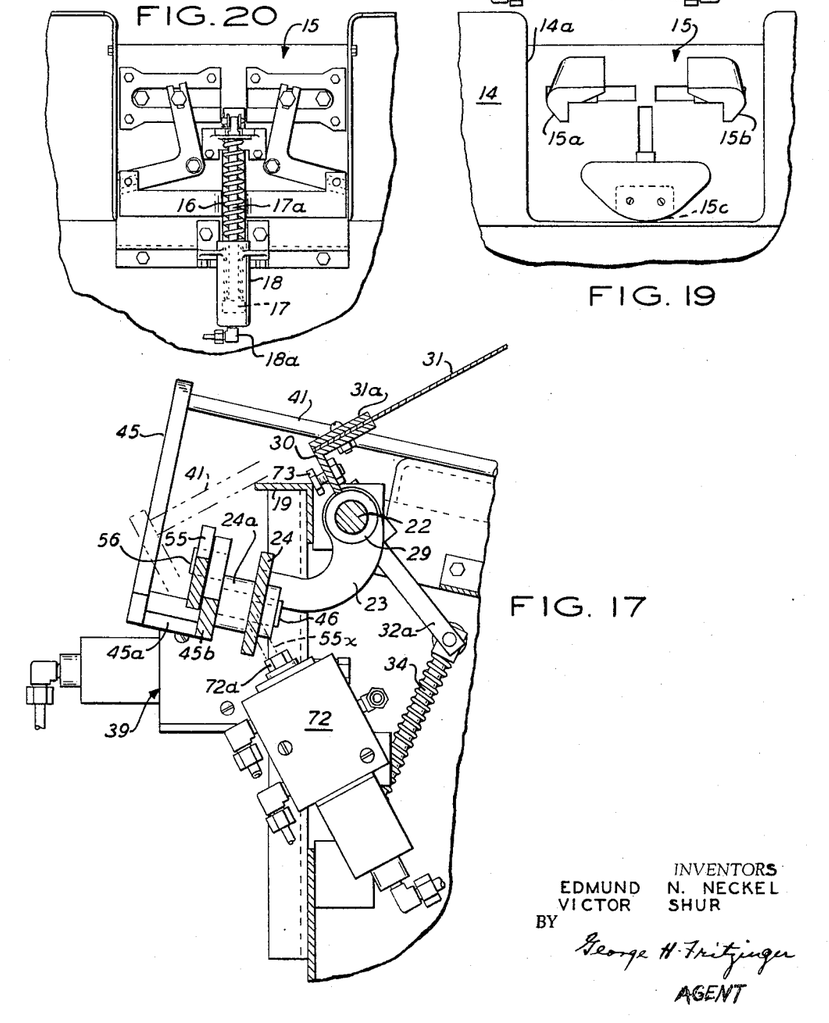
FIGURE 17 is a fractional vertical sectional view taken on the line 17—17 of FIGURE 9.
FIGURE 19 is a plan view of the collar holding device.
FIGURE 20 is a bottom view of the mechanism for operating the collar holding device.

The table top 14 has a central rectangular cutaway 14a in which is inset a collar holder 15. This holder is of a standard construction comprising three collar blocks 15a, 15b and 15c to receive the collar opening of a shirt when the shirt is dressed, front down, on the table top. The two rearward collar blocks 15a and 15b are mounted for laterally slidable movement and the front collar block 15c for front-to-back slidable movement. They are shown in FIGURE 19 in their expanded positions in which they are normally held by a helical compression spring 16 (FIGURE 20). The blocks are moved by a piston rod 17a having a piston 17 at one end fitting slidably in a small air cylinder 18 herein termed the "collar" cylinder. The spring 16 surrounds the piston rod and urges it into its retracted position when air is not supplied to the cylinder 18. When air is admitted under pressure to the cylinder 18 via a nozzle 18a the piston 17 is driven outwardly against the pressure of the spring 16 to move the collar blocks 15 inwardly so that a shirt collar can be easily placed thereon.

Figure 2:
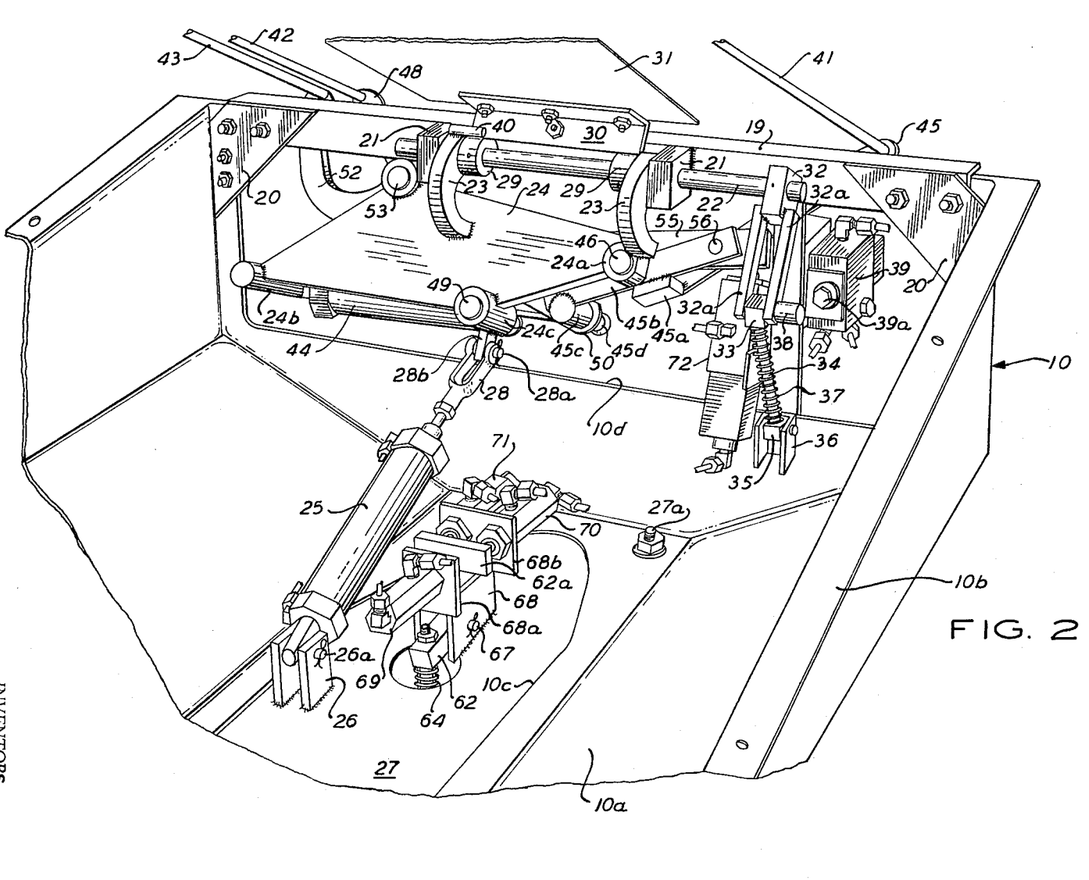
FIGURE 2 is a front perspective view, with the table top removed and portions of the frame broken away, showing the shirt folding mechanism.
Figure 3:
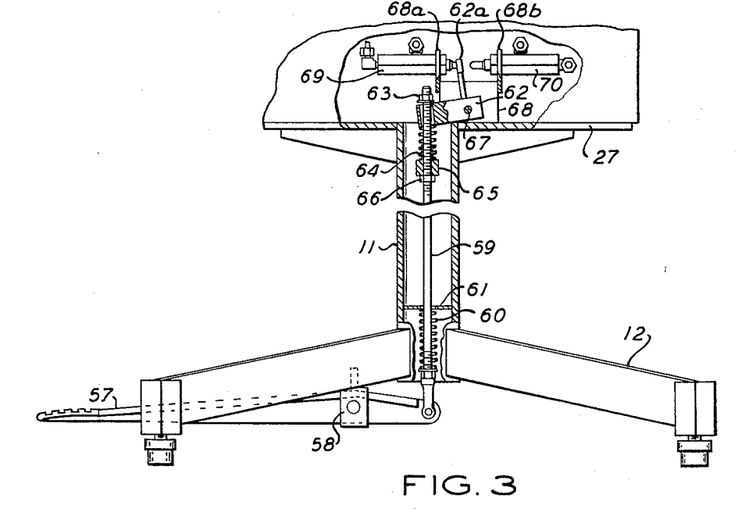
FIGURE 3 is a right hand side elevational view with portions of the frame structure broken away to show the pedal-operated valve mechanism.
Figure 4:
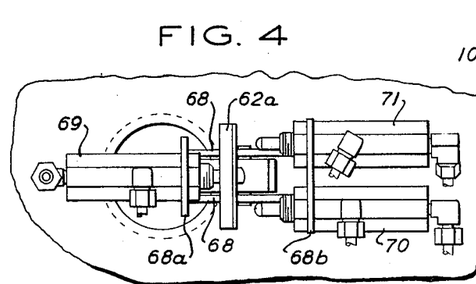
FIGURE 4 is a plan view of the pedal-operated valve mechanism to a larger scale.

As shown in FIGURE 2, the back wall of the housing 10a has a large rectangular opening 10d leading through the top edge of the back wall, which is bridged at the top by a transverse angle iron 19 secured at its ends to the table housing by triangular corner pieces 20. Welded to the inside wall of the angle iron 19 are two laterally spaced block-shaped bearings 21 supporting a transverse shaft 22. Pivoted freely on the shaft 21 against the inner faces of the bearings are two semicircular arms 23 which depend from the shaft. These arms are welded at their lower ends to a plate 24 which carries the entire folding mechanism, as will appear. Since the plate 24 is pivotally supported on the shaft 21 the folding mechanism can be tilted between a position wherein its folding arms 41, 42 and 43 are parallel with the table top 14 (FIGURES 1 and 9) and a position wherein they are inclined upwardly therefrom (FIGURE 2). The tilting of the folding mechanism between these two positions is done by a two-way "tilt" air cylinder 25 shown in FIGURE 2. This cylinder is pivotally supported at its base end on a pivot pin 26a carried by two lugs 26 welded to the mounting plate 27. A clevis 28 is secured to the outer end of the piston rod and carries a cross pin 28a pivoted in an apertured lug 28b welded to the plate 24. Thus, the air cylinder 25 is operatively interposed between the mounting plate 27 and the base plate 24 carrying the folding mechanism.

Figure 11:
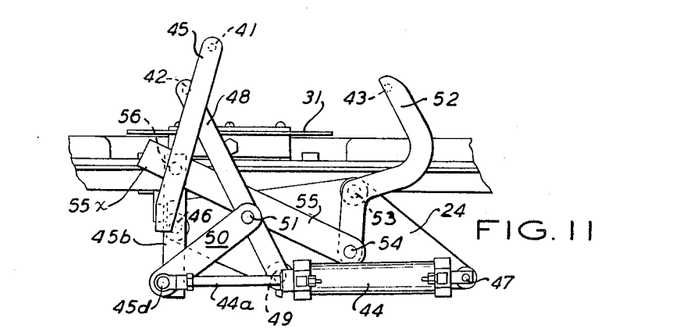

Between the two arms 23 are two spaced collars 29 pinned rigidly to the shaft 22. These collars carry an angle iron 30 which is welded thereto. Bolted to the angle iron 30 through a top reenforcing strip 31a is a form plate 31. This form plate can be shifted between one position wherein it inclines upwardly from the table top 14 as shown in FIGURES 1, 2 and 17 and a position wherein it is parallel to and slightly above the table top 14 as shown in FIGURE 11. The two positions of the form plate are defined by an over-center toggle comprising two parallel arms 32a welded to the opposite sides of a block 32 which in turn is pinned to the right end portion of the shaft 22. A plunger 34 has a head portion 33 at its upper end pivoted between the lower end portions of the arms 32a. This plunger extends slidably downwardly through an apertured block 35 pivoted to a bracket 36 secured to the housing 10a. On the rod 34 between the head 33 and block 35 is a helical compression spring 37 to provide an over-center action when the form plate is shifted manually between its positions above-defined. The upwardly inclined position—which is the idle position—is determined by abutment of a screw 73 in the angle iron 30 against a corner edge of the frame angle iron 19 (FIGURE 17). The lower operated position of the form plate is determined by abutment of a roller 38 on the center pivot of the head 33 against the stem of a valve 39. By this abutment the valve is operated to start a folding operation as is later described.

A one-way coupling is provided between the folding mechanism plate 24 and the form plate 31 in the form of a transverse pin 40 welded to the left arm 23 and extending across the front face of the angle iron 30 as shown in FIGURE 2. When the folding mechanism is swung forwardly to raise the folding arms 41, 42 and 43 into an upwardly inclined position as shown in FIGURE 2, the pin 40 abuts against the angle iron 30 to swing the form plate 31 in unison with the folding arms. When the folding mechanism is next swung to lower the folding arms into parallel relation to the table top 14 the form plate 31 is however retained in its upwardly inclined position by the toggle mechanism above-described. The form plate 31 can now be tilted downwardly by manual means at the will of the operator.

Figure 15:
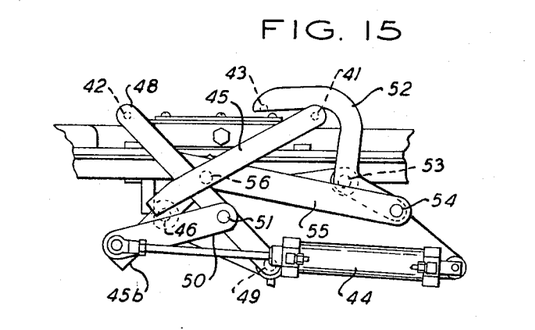
Figure 18:
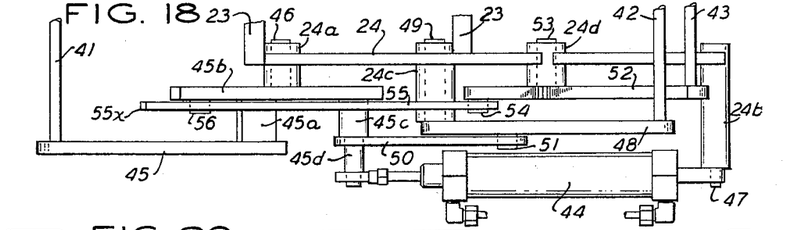
FIGURE 18 is a plan view of the operating linkage for the folding arms.

The folding arms 41, 42 and 43 are preferably in the form of rods which are staked at right angles to respective levers 45, 48 and 52. These levers are pivoted to the plate 24 respectively at 46, 49 and 53. The lever 45 is welded at its inner end to a spacing block 45a which in turn is welded to the central portion of a lever 45b. The parts 45 and 45b are thus spaced from each other but are integral and constitute a single lever. The lever portion 45b is secured at a midpoint to the stud 46 which pivots in a bearing 24a welded to the plate 24 as shown in FIGURE 2. Welded to a lower end of the lever portion 45b is a stud 45c (FIGURE 2) which has a reduced end portion 45d on which is pivoted a link 50 and the outer end of the cylinder rod 44a of the air cylinder 44. The other or base end of this air cylinder is pivotally connected at 47 to the hub 24b welded to the plate 24 as shown in FIGURE 18. Thus, as the air cylinder 44 is activated from a contracted to an expanded condition the folding arm 41 is swung about the pivot center 46 from a position at the left side of the table top 14 (as viewed from the rear in FIGURE 9) to the right side thereof as shown in FIGURE 15.

The other end of the link 50 is pivotally connected at 51 to the lever 48 carrying the folding arm 42. The pivot 49 for the lever 48 is in a bearing 24c welded to the plate 24 and the pivot point 51 of the link 50 on the lever 48 is only a short distance from the pivot center of the lever as shown. As the air cylinder 44 is activated from its contracted to expanded conditions the folding arm 42 is swung about the pivot center 49 from a position at the right side of the table top (as viewed from the rear in FIGURE 9) to the left side thereof but the movement thereof is within the arc defined by the folding arm 41 as shown in FIGURE 11. As the folding arm 42 terminates within the arc defined by the folding arm 41 so the folding arm 41 terminates with the arc defined by the folding arm 42.

The lever 52 which carries the folding arm 43 is pivoted at 53 in a hub 24d welded to the plate 24. The hub 24d is at the top of the plate 24 nearer the table top than are the hubs in which the folding arms 41 and 42 are pivoted, and therefore the folding arm 43 is moved on a shorter radius than are the other arms. The arm 43 stands initially just beyond the arm 42 as shown in FIGURE 9. The lever 52 is hook-shaped between the folding arm 43 and the pivot point 53 so that the lever 52 will clear the folding arm 42 as the folding mechanism is operated. The lever 52 has a short downward extension past its pivot 53 and is pivotally connected at 54 to one end of a link 55 the other end of which is pivoted at 56 to the upper end of the lever portion 45b. As the air cylinder is activated from a contracted to an expanded condition the arm 43 is swung about pivot 53 from its start position just to the right of the arm 42 (as seen from the rear in FIGURE 9) to a terminal position between the arms 41 and 42 but nearer to the arm 41 as shown in FIGURE 15.

A feature of the present invention resides in so locating the pivot points of the folding arms and in so arranging the lever arms and coupling links between the arms that the arms will be moved at varying speeds and in the right timing to perform an effective shirt folding operation. For instance, the lever 42 for the folding arm 43 is connected to the link 55 below the pivot point 53 and the other end of the link 55 is connected at 56 to the arm 45b which is at a point above the pivot point 46 of the lever 45–45b. Clockwise swinging of the lever 45–45b (as viewed in FIGURES 9 and 11) therefore effects a counterclockwise swinging of the lever 52. The coupling transmission ratio between these two levers is therefore varying throughout the stroke of movement of the levers, determined by the relative locations of the pivot centers and by the lengths of the coupling arms and links. By reason of the link coupling between the piston rod of the air cylinder 44 and the lever 48 there is likewise a varying transmission ratio between the cylinder and this lever. By proper layout of this link-coupled lever mechanism the folding arms are moved at relative varying speeds and in the proper sequence to produce the right folding movements. A further advantageous feature is that all of the components of the folding mechanism are positively interconnected in a simple manner to produce a positive and dependable operation without the use of cams or discontinuous couplings.

Figure 5:
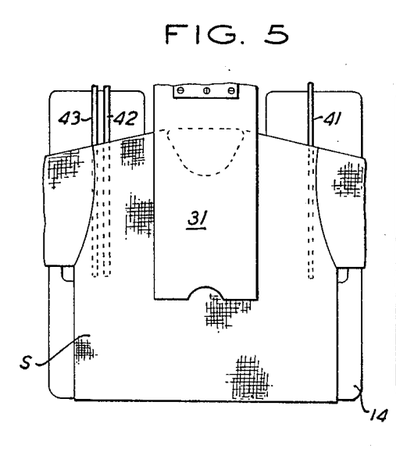
FIGURES 5, 6 and 7 are plan views of the table top with a shirt thereon, showing the folding operation by progressive steps.
Figure 10:
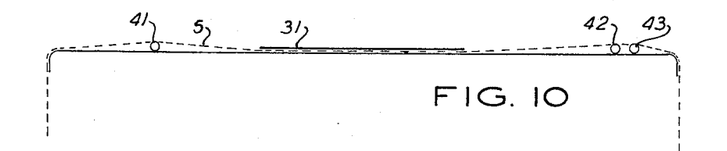
FIGURES 10, 12, 14 and 16 are rear diagrammatic views corresponding to FIGURES 9, 11, 13 and 15 respectively, showing the shirt folding arms in progressive stages of operation in relation to a shirt being folded, starting with an unoperated position in FIGURE 10 to a fully operated position in FIGURE 16.

In FIGURE 9 the form plate 31 is fractionally shown in its upwardly inclined position and the air cylinder 25 is shown in its extended position placing the folding arms into parallel relation with the table top. A shirt is now dressed, face down, on the table top overlying the folding arms and with the collar being placed on the collar blocks 15. The form plate is then moved downwardly upon the shirt by the operator into the position shown in FIGURE 5. As this is done the roller 38 operates the valve 39 and starts the folding mechanism operating as is later described. As the folding mechanism is operated the folding arms shown in FIGURES 9 and 10 are moved to successive stages of operation as is herein next described.

Figure 12:
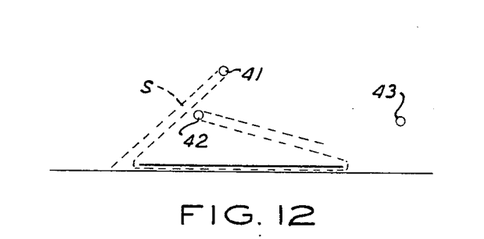
Figure 13:
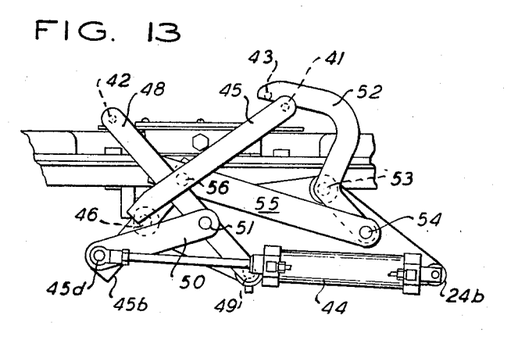
Figure 14:
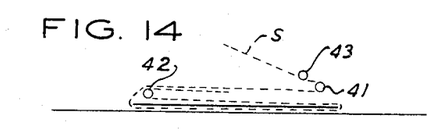
Figure 16:
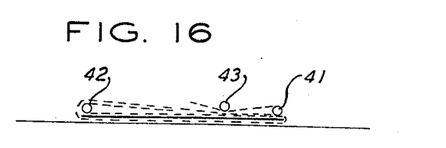

At a first intermediate stage of operation the arm 41 is swung upwardly to a position as shown in FIGURES 11 and 12 but the arm 42 has been swung farther and is now below the shirt portion stretching from the arm 41. At this stage the arm 43 has moved only slightly above the table top 14 and is not yet performing any useful operation. Thus, at this stage the arm 42 is making a first fold of the right half portion of the shirt as seen from the rear of the machine onto the form plate 31 and the arm 41 is in the process of making a second fold of the left half portion of the shirt onto the first fold. In a second intermediate stage of operation shown by FIGURES 13 and 14 the arms 41 and 42 have nearly completed their movements and the arm 43 is now moving down at an accelerated rate onto the sleeve end portion trailing the arm 41. Note that the sleeve portion which has trailed the arm 42 is now being folded down by the second fold stretching from the arm 41 and that the sleeve portion which is trailing the arm 41 is now being pressed down into place against the second fold by the arm 43. The arm 43 thus prevents the outer sleeve of the folded shirt from slipping over the arm 41. At the end of the folding operation shown in FIGURES 15 and 16 all folds are completed and are flat on the form plate 31 with the arm 43 holding the outer sleeve end portion of the fold in place until the operator folds up the tail portion of the shirt and places a wrapping band therearound.

Figure 6:
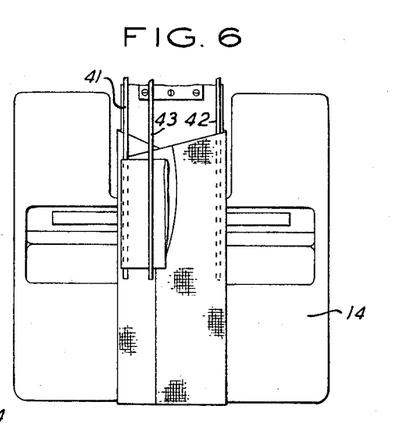
Figure 7:
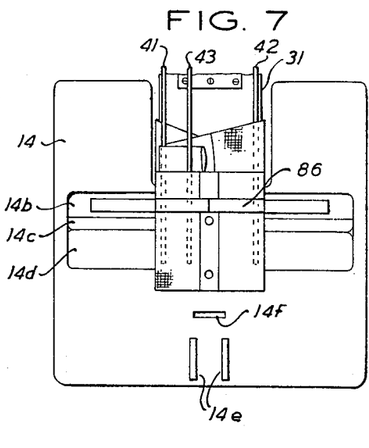

From another aspect it will be seen that in a folding operation the arms 42 and 41 are swung inwardly from "open" positions in the sequence named, coming respectively to terminal positions above and near the side edges of the form plate 31 which are the farther from the starting positions of the respective rams. (FIGURES 6 and 7). Furthermore, the arm 43 is moved in between the two arms 42 and 41, coming to rest nearer the trailing arm 41 to do a final folding of the outer shirt sleeve.

The motor components of the present folding mechanism are the collar cylinder 18, the tilt cylinder 25 and the fold cylinder 44. These motor components are manually controlled by the tilting of the form plate 31 and by a foot pedal 57. In brief, the operation is as follows: Starting with the folding arms 41, 42 and 43 in their downward positions on the table top and form plate 31 in its upwardly inclined position (FIGURES 1, 9 and 17) the operator depresses the foot pedal 57 which as later described contacts the collar holder 15 and allows the buttoned collar of a dress shirt to be put over the holder face down. The operator then releases the foot pedal permitting the collar holder to be expanded to grip the collar. After straightening out the shirt on the table top the operator snaps downwardly the form plate 31 which starts the folding mechanism operating to complete a folding of the shirt. When the folding operation is completed by the folding mechanism, the operator folds upwardly the tail portion of the shirt and places a paper band 86 around the folded shirt on the form plate 31. The operator next depresses the foot pedal which releases the shirt collar from the collar holder and tilts upwardly the form plate and the folding arms. While continuing to hold the foot pedal depressed the operator slips the folded shirt off of the form plate. Upon next releasing the foot pedal, the folding arms are returned to their initial open positions and are then returned down onto the table top in the sequence here named. All parts are therefore now back in their starting positions shown in FIGURES 1, 9 and 17. The control apparatus of the folding mechanism is herein next described.

The foot pedal 57 is pivoted at 58 to a bracket secured to one of the legs 12, and is pivotally connected at its rearward end to a coupling rod 59 which runs upwardly through the hollow post 11. A compression spring 60 is placed on the lower end portion of the coupling rod between an internal wall 61 of the post and a collar on the lower end of the rod normally to hold the rod down and the foot pedal raised. The rod has a threaded upper end portion which extends loosely through a clearance hole in a lever 62. A nut and washer 63 are placed on the rod above the lever 62, and a compression spring 64 is placed on the rod between the lever 62 and a lower washer 65 and nut 66 so as to provide a yieldable and adjustable coupling between the rod 59 and lever 62. This yieldable coupling is adapted to prevent undue pressure being exerted against the valves controlled by the foot pedal, as will appear.

The lever 62 is pivoted on a shaft 67 supported by two upright bracket plates 68 welded to the mounting plate 27. The lever 62 has an upright arm with a cross piece 62a which is moved between a front valve 69 and a set of rearward valves 70 and 71. The valve 69 is mounted on a cross plate 68a welded to the front ends of the bracket plate 68, and the valves 70 and 71 are mounted on a cross plate 68b welded to the rear ends of the bracket plate 68. Under action of the spring 60 the front valve 69 stands normally operated and the rear valves 70 and 71 normally unoperated. When the foot pedal is depressed the valve 69 is released and the valves 70 and 71 are operated.

Mounted near the valve 39 is a second valve 72 as shown in FIGURES 2, 9 and 17. The valve 72 is operated by the end part 55x of the link bar 55 only when the folding arms are returned to their open positions while still standing in their upwardly inclined positions above the table top. As before-described, the arms are so moved to their open positions upon the release of the foot pedal. It is by the operation of the valve 72 when the arms are so returned that the tilt cylinder 25 is operated to swing next the folding mechanism downwardly to bring the folding arms onto the table. In FIGURE 17 there is dottedly shown the end part 55x of the link bar 55 as it engages the valve stem 72a. As will appear, the valve stem 72a is in an extended position when a shirt has been folded and the assembly is tilted upwardly. Thus, in the subsequent opening of the folding arms while the arms are still in their upwardly inclined positions the valve stem is impinged on by the link bar 55 and operated to activate the tilt cylinder 25.

Figure 21:
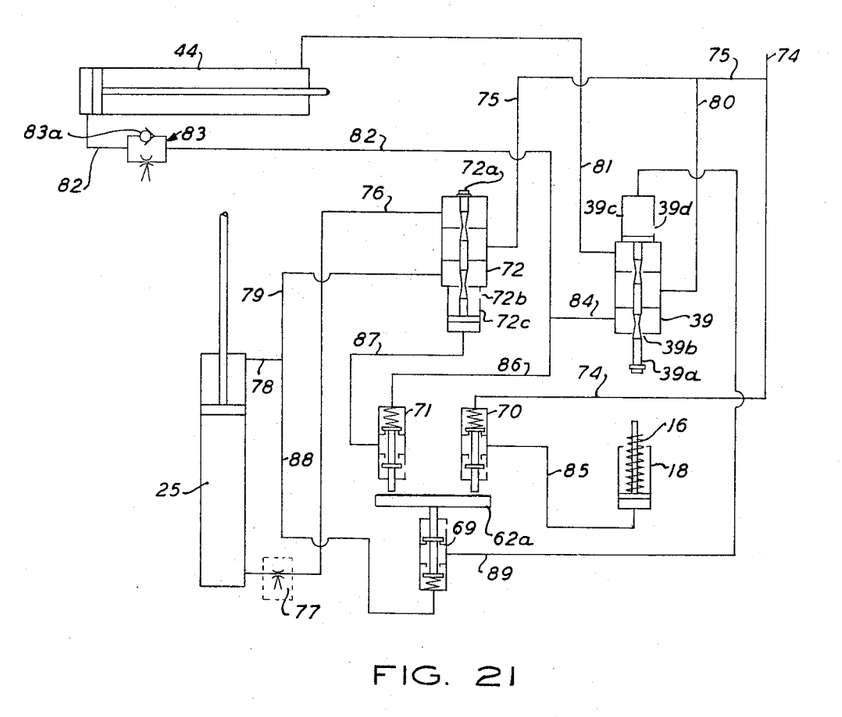
FIGURE 21 is a diagram of the pneumatic system for controlling and operating the air cylinders used in the present folding mechanism.

The operation of the air pressure system particularly with reference to the diagram of FIGURE 21 is as follows. In the starting condition when the folding mechanism is open and tilted downwardly, and the form plate 31 is upwardly inclined, the tilt cylinder 25 is receiving pressure at its back end and the cylinder is therefore extended. No pressure is now going to the collar cylinder 18 with the result that the collar holder is expanded. The air pressure to the back end of the tilt cylinder is from a source 74 via line 75 to the inlet of the slide type valve 72, thence through the valve via air line 76 to the back end of the tilt cylinder through a needle valve 77 to prevent any sudden operation of the cylinder. The front end of the tilt cylinder is now open to the atmosphere via air lines 78 and 79, the valve 72 and vent 72b.

Air pressure is now transmitted from the source 74 via a line 80, the valve 79 and line 81 to hold the fold cylinder 44 in a contracted positions. The back end of the fold cylinder is now open to the atmosphere via a line 82, check needle valve 83, line 84 and valve 39 to vent 39b. The needle valve is paralleled by a one-way valve 83a so as to allow unthrottled air flow to the back end of the cylinder 44 while causing the exhaust flow to be needled for the purpose of avoiding excessive speed when the folding assembly is opened.

The valves 39 and 72 are of the "stay put" type respectively having small air cylinders 39c and 72c at their ends to shift the valves in their forward directions. In FIGURE 21, these valves appear in the positions they have at the end of a folding operation. For instance, no air is in cylinder 72c at this time with the result that the valve 72 is retracted. The valve 39 has its stem extended but no air pressure is going to the air cylinder 39c because the line thereto is shut off at the valve 72. No pressure is going to the collar cylinder 18 since the valve 70 is closed.

When the operator now places a shirt face down onto the table and depresses the foot pedal to operate the valve 70 air pressure is fed via line 85 to the collar cylinder 18 to contract the collar holder. After the shirt collar is placed on the holder the operator releases the foot pedal to release the valve 18 and allow the collar holder to expand and grip the collar.

After the operator has straightened out the shirt on the table top she swings down the form plate 31 causing the roller 38 to move against the stem of the valve 39 and press the stem inwardly. This movement of the valve stem cuts off air pressure to the front end of the fold cylinder 44 and vents it to the atmosphere via the line 81 and valve vent 39d. Air pressure now goes to the back end of the fold cylinder via lines 75 and 80, valve 39, lines 84 and 82 to operate the arm folding mechanism. After the folding arms are operated the operator finishes by folding up the tail portion and placing a fastening band 86 around the folded shirt on the form plate (FIGURE 7). These bands are kept in a well 14b in the table top. This well may also contain various kinds of fastening bands and filler pieces 14c and 14d. Also the table top may include a pair of guide strips 14e and an aperture 14f lighted from below to aid in first placing the shirt in a centered position. Also, a cardboard may be placed under the form plate 31 and be retained with the folded shirt as a stiffener.

When the operator steps on the foot pedal after the shirt is folded, the valves 70 and 71 are opened. The opening of valve 70 operates the collar cylinder 18 to contract the collar holder and release it from the shirt. Since the stem of the valve 39 is in its inward position, pressure is going via lines 84 and 86, valve 71 and line 87 to the cylinder 72c to shift the valve 72 to its extended position. This cuts off the air to the back end of the tilt cylinder 25 and introduces air into the front end via lines 79 and 78. The tilt cylinder then swings the folding assembly upwardly and the operator slips off the folded shirt from the form plate 31. During all this time the operator keeps the foot pedal depressed. When the foot pedal is next released the valve 69 is opened to allow air pressure via valve 72, lines 79 and 88, valve 69 and line 89 to go to the cylinder 39c, shifting the valve 39 forwardly to its original position. This cuts off air to the back end of the fold cylinder 44 and introduces air to the front end to return the folding assembly to open position. Since the folding assembly is still in its "arms up" position, the linkage end 55x pushes down the stem of valve 72 to return it to its original position to feed air pressure to the back end of the tilt cylinder and swing the folding assembly down but the form plate 31 remains still in its upwardly tilted position. The entire mechanism is now back in its starting position.

Figure 8:
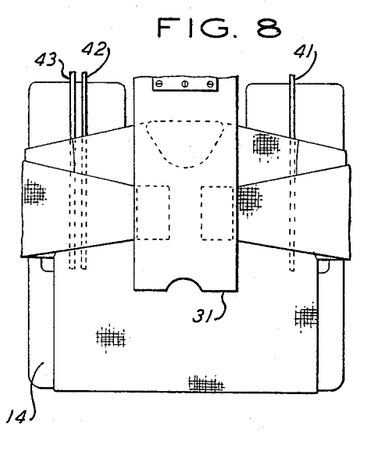
FIGURE 8 is a view similar to FIGURE 5 showing how a long-sleeve shirt is folded by the present mechanism after a preliminary manual folding operation.

Although the present folding mechanism is designed especially for folding short-sleeve shirts, it can be used also for folding long-sleeve shirts provided the operator does a preliminary hand folding operation. This hand folding operation is simply to fold each long sleeve back on itself, placing the cuffs under the form plate 31 as shown in FIGURE 8. Thereupon, the folding operation continues exactly as hereinbefore described.

The embodiment of our invention herein particularly shown and described is intended to be illustrative and not necessarily limitative of our invention since the same is subject to changes and modifications without departure from the scope of our invention, which we endeavor to express according to the following claims.

We claim:

1. A shirt folding mechanism comprising a table for supporting a shirt thereon front down, a form plate movable downwardly onto the central body portion of a shirt on said table, a first folding arm at one side of said form plate and second and third folding arms on said table at the other side of said form plate over which side portions of said shirt are placed, a frame below said table, means pivotally supporting said folding arms on said frame for movements in respective paths crossing each other, two-way intercouplings with varying transmission ratios between said folding arms causing the arms to be moved sequentially through their paths from open to closed positions in an arrangement wherein said first arm is moved across said second arm and said third arm is thereupon moved across said first arm and two-way motive means for operating said arms.

2. A shirt folding mechanism comprising a table for supporting a shirt thereon front down, a form plate movable downwardly onto the central body portion of a shirt on said table, a plurality of folding arms on said table at the sides of said form plate over which side portions of said shirt are placed, a frame below said table, means pivotally supporting said folding arms on said frame for movements in respective paths crossing each other, two-way intercouplings with varying transmission ratios between said folding arms causing the arms to be moved sequentially through the major portions of their paths from open to closed positions and back again, a single two-way motive means for operating said arms, means responsive to moving said form plate downwardly onto said table to start said motive means in a forward direction to fold a shirt, means for swinging said frame to tilt said folding arms upwardly from said table, a one-way coupling between said frame and said form plate to cause the form plate to be tilted upwardly in unison with the upward tilting of said folding arms, a motive means for tilting said frame, control means including a control member shiftable in one direction to tilt said folding arms and said form plate in unison upwardly from said table while said arms are in their closed positions and shiftable in the reverse direction to return said folding arms to open positions and thereupon to tilt said arms downwardly onto said table.

3. A shirt folding mechanism comprising a table for supporting a shirt thereon front down, a form plate movable downwardly onto the central body portion of a shirt on said table, a folding arm on said table at one side of said form plate and a plurality of folding arms on said table at the other side of said form plate over which side portions of said shirt are placed, a frame below said table for said folding mechanism, each of said folding arms having a fixed pivot on said frame to permit the arm to be swung inwardly to a predetermined closed position over said form plate, a single motive means for swinging said folding arms, and link members intercoupling said folding arms for causing the arms to be operated in a predetermined sequence to closed positions by said motive means to fold the side portions of said shirt in sequence onto said form plate.

4. The shirt folding mechanism set forth in claim 3 wherein said link members provide a positive two-way coupling means between said folding arms, and wherein said motive means is a piston-type air cylinder operable in a forward direction to swing said arms from open to closed positions in a predetermined sequence and operable in a reverse direction to return said arms to their open positions.

5. A shirt folding mechanism comprising a table for supporting a shirt thereon front down, a form plate movable downwardly onto the central body portion of a shirt on said table, a plurality of folding arms on said table at the sides of said form plate over which side portions of said shirt are placed, a frame below said table for said folding mechanism, respective pivots for said folding arms on said frame to permit each arm to be swung inwardly to a predetermined closed position over said form plate, a single motive means for swinging said folding arms, link members intercoupling said folding arms for causing the arms to be operable in a predetermined sequence to closed positions by said motive means to fold the side portions of said shirt in sequence onto said form plate, said link members providing a positive two-way coupling means between said plurality of folding arms, said motive means comprising a piston-type air cylinder operable in a forward direction to swing said arms from open to closed positions in a predetermined sequence and operable in a reverse direction to return said arms to their open positions, means pivotally supporting said form plate on an axis along the back of said table, means independently pivotally supporting said frame also on said axis whereby said folding arms and form plate are tiltable upwardly in unison from said table, an over-center toggle acting on said form plate to hold the plate releasably in its respective positions, a one-way coupling between said frame and form plate to tilt the form plate upwardly as said folding arms are tilted upwardly, and a piston-type air cylinder for shifting said frame back and forth between its respective positions.

6. The shirt folding mechanism set forth in claim 5, including means operative when said folding arms are on said table for activating said first air cylinder in a forward direction responsive to manually tilting said form plate downwardly onto said table, pedal means depressible to activate said second mentioned air cylinder in one direction to tilt said folding arms and form plate in unison upwardly from said table and releasable to activate said first mentioned air cylinder in a reverse direction, and means responsive to said folding arms reaching their open positions by the reverse activation of said first mentioned air cylinder for activating said second mentioned air cylinder in the other direction to tilt said folding arms downwardly onto said table while said toggle retains said form plate in its upwardly tilted position.

7. A shirt folding mechanism comprising a table for supporting a shirt front down, a form plate covering the central body portion of the shirt, a pair of folding arms underlying a side portion of said shirt in adjacent relationship to each other at one side of said form plate, a single folding arm underlying a side portion of said shirt at the other side of said form plate, motive means for swinging the innermost one of said pair of arms in an inward direction across said form plate to a terminal position on the opposite border portion of the form plate, means coupled to said motive means for concurrently swinging said single arm inwardly across said form plate to a terminal position on the opposite border portion of the form plate and at a relatively lower speed whereby said innermost folding arm makes a first fold of a side portion of the shirt onto said form plate and said single arm makes a second fold of the other side portion of the shirt onto said first fold, and means coupling the outermost one of said pair of arms to said single arm for concurrently swinging said outermost arm inwardly onto a central portion of said form plate after said innermost and single arms have substantially reached their terminal positions whereby to fold inwardly the outer shirt sleeve trailing said single arm.

8. A shirt folding mechanism comprising a table for supporting a shirt front down to be folded, a form plate covering the central body portion of the shirt, a first folding arm underlying a side portion of said shirt at one side of said form plate, an inner-second folding arm and an outer-third folding arm underlying a side portion of said shirt at the other side of said form plate, said folding arms being parallel with the top of said table, respective first, second and third levers carrying said folding arms and extending downwardly at the back of said table, a frame plate below said table, a first pivot on said frame plate for said first lever spaced a predetermined distance from a vertical medial plane through said form plate in the direction of the first folding arm from said plane, a second pivot on said frame plate for said second lever spaced farther below said table than said first pivot and spaced from said medial plane in the direction of the second folding arm from said plane by substantially said predetermined distance, said first lever being shorter than said second lever so that said first and second folding arms are spaced substantially equally from said medial plane, a third pivot for said third lever spaced a lesser distance below said table than said first pivot and spaced from said medial plane in the direction of the third folding arm from said plane by a substantially greater distance than said predetermined distance, said third lever being also substantially shorter than said second lever, a substantially horizontal piston-type air cylinder for operating said levers pivotally supported at its base end on said frame plate and pivotally connected at the other end of its piston rod to an integral extension of said first lever beyond its pivot, a coupling link pivoted at one end to said piston rod and at the other end to said second lever at a point thereon between said second pivot and said second folding arm, and another coupling link pivoted at one end to an integral extension of said third lever beyond its pivot and at the other end to said first lever at a point thereon between said first pivot and said first folding arm.

9. The folding mechanism set forth in claim 8 including means pivotally supporting said form plate on a horizontal axis at the back of said table, and an additional means pivotally supporting said frame plate also on said horizontal axis whereby to permit said form plate and folding arms to be moved upwardly in unison from said table.

10. A shirt folding mechanism comprising a table for supporting a shirt to be folded, a form plate pivoted at the back of the table and movable downwardly to cover the central body portion of a shirt to be folded, a folding mechanism including a plurality of folding arms underlying side portions of said shirt, a frame below said table, respective levers carrying said folding arms and pivoted to said frame and means pivotally supporting said frame also at the back of said table, a first air cylinder for operating said folding mechanism, a second air cylinder operable in one direction for tilting said frame and form plate in unison to swing said folding arms and form plate upwardly from said table and in a reverse direction to return said folding arms onto the table, detent means for holding said form plate in its upwardly tilted position as said folding arms are returned onto the table, and an air pressure system for operating said air cylinders comprising a first pressure-operated valve operable in a reverse direction by manually lowering said form plate onto the table for activating said first air cylinder in a forward direction to effect a shirt folding operation.

11. The shirt folding mechanism set forth in claim 10 including a second pressure-operated valve for controlling said tilt cylinder, a foot pedal, a first manually operable valve operated by depressing said foot pedal for obtaining pressure via said first pressure-operated valve to operate said second pressure-operated valve whereby to activate said tilt cylinder in a direction to raise said folding arms and form plate from said table.

12. The shirt folding mechanism set forth in claim 11 including a second manual valve operable by release of said foot pedal to apply pressure via said second pressure-operated valve and said second manual valve to operate said first pressure-operated valve and apply pressure to said first air cylinder in a direction to return said folding arms to "open" positions.

13. The shirt folding mechanism set forth in claim 12 including means mechanically operable by the return of said folding mechanism to open position while said folding arms are upwardly tilted from the table for mechanically returning said second pressure-operated valve to un-operated position for applying pressure to said second air cylinder to tilt said folding arms downwardly onto the table.

References Cited by the Examiner

UNITED STATES PATENTS

| 2,508,108 | 5/1950 | Gayring et al. | 223—37 |
| 2,616,595 | 11/1952 | Arruda | 223—37 |
| 2,629,521 | 2/1953 | Johnson et al. | 223—37 |
| 2,913,156 | 11/1959 | Pearson et al. | 223—37 |
| 2,950,848 | 8/1960 | Gayring | 223—37 |
| 3,013,704 | 12/1961 | Freeman | 223—37 |

JORDAN FRANKLIN, *Primary Examiner.*

G. V. LARKIN, *Assistant Examiner.*